May 2, 1933.  B. P. HOFFMAN  1,906,266
BALL VALVE
Filed July 12, 1930   2 Sheets-Sheet 1

INVENTOR
Benjamin P. Hoffman
BY
ATTORNEY

May 2, 1933. B. P. HOFFMAN 1,906,266
BALL VALVE
Filed July 12, 1930 2 Sheets-Sheet 2
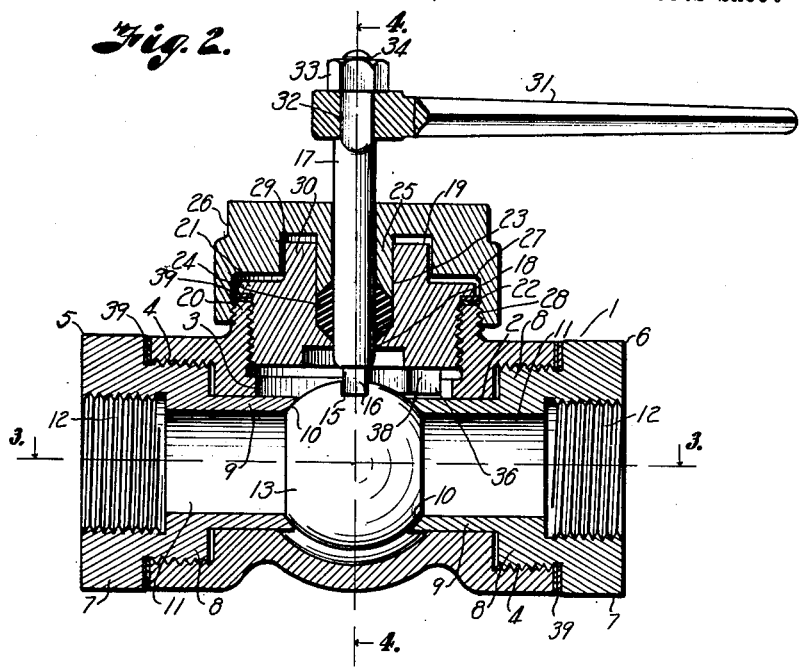
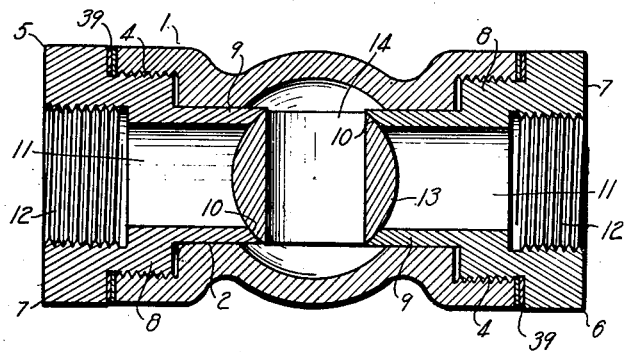
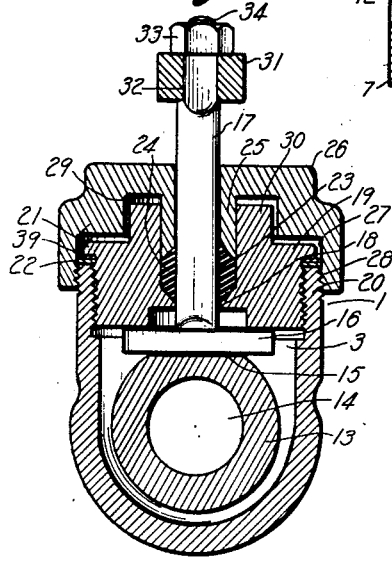
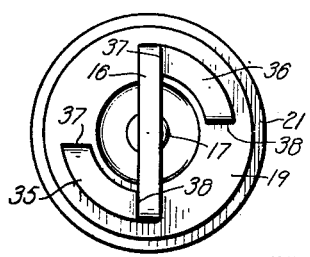
INVENTOR
Benjamin P. Hoffman
BY
Arthur C. Brown
ATTORNEY Patented May 2, 1933

1,906,266

UNITED STATES PATENT OFFICE

BENJAMIN P. HOFFMAN, OF TULSA, OKLAHOMA

BALL VALVE

Application filed July 12, 1930. Serial No. 467,487.

My invention relates to valves and more particularly to a ball valve, the principal objects of the invention being to provide a device of this character that can be manufactured at low cost, that can be readily operated under abnormal conditions, that will automatically maintain a clean seat, and that will effectively control flow of fluids under high pressures.

A further object of my invention is to provide a valve, including means to compensate for wear of the principal parts thereof, thereby materially extending the life of the valve.

In accomplishing these and other objects of my invention I have provided improved details of structure the preferred form of which is illustrated in the accompanying drawings, wherein:

Fig. 2 is a central longitudinal section of the valve in open position.

Fig. 3 is a central horizontal section on the line 3—3 Fig. 2 showing the valve moved to closed position.

Fig. 4 is a vertical cross section on the line 4—4 Fig. 2.

Fig. 5 is a bottom plan view of the bonnet member, particularly illustrating the means for limiting movement of the valve ball to either opened or closed positions.

Figure 1:
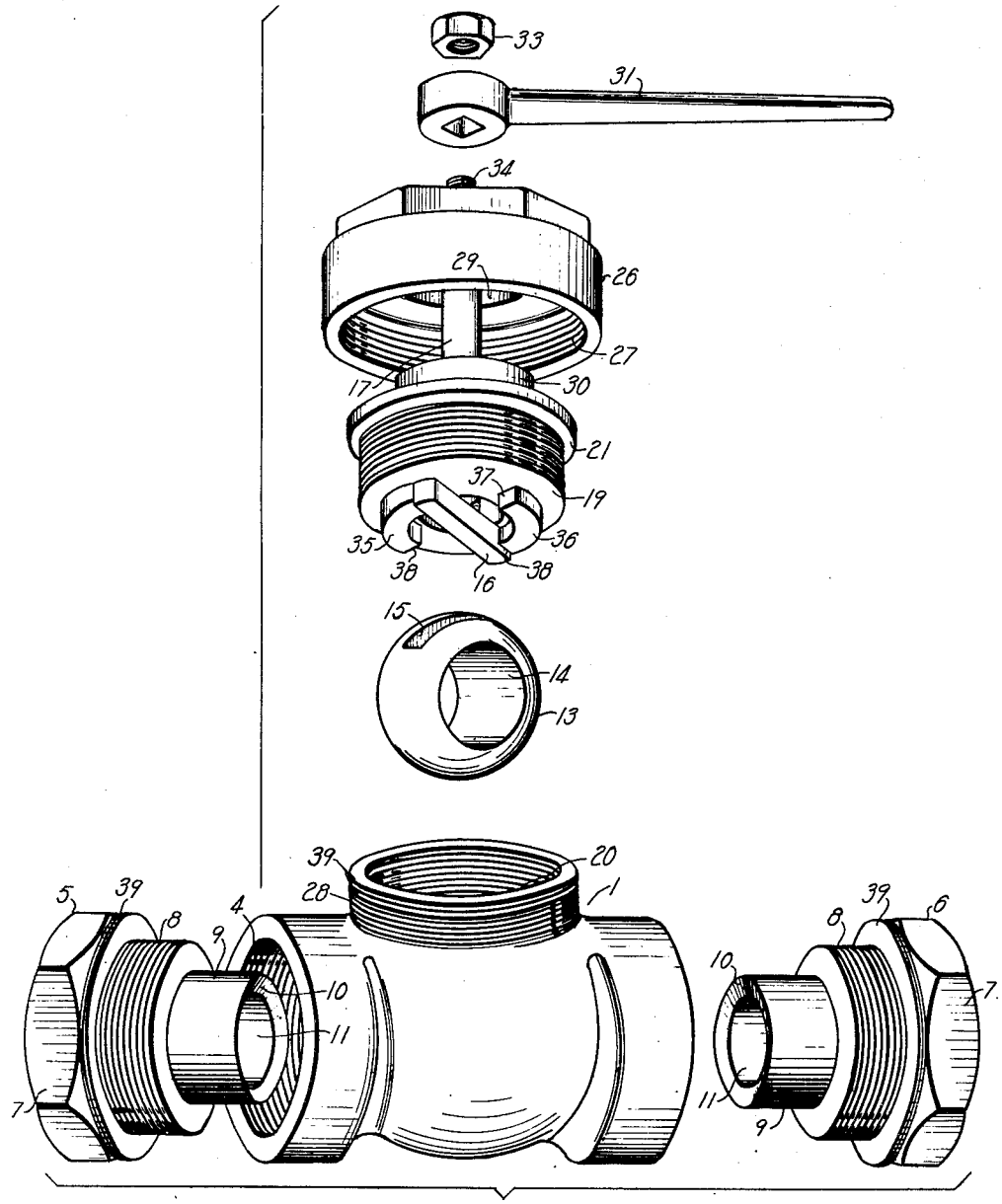
Fig. 1 is a perspective view of the valve in disassembled but related condition.

Referring more in detail to the drawings:

1 designates a valve housing having a longitudinal opening 2 and a central lateral opening 3 extending therein from the upper side of the housing.

Concentric sockets 4 are counter-bored into each end of the longitudinal opening and internally threaded to receive cooperating valve seat members 5 and 6 identical in construction, and each including a hexagonal head 7, a reduced, externally threaded portion 8 for engaging the threaded sockets 4, and a further reduced inner end 9, fitting snugly into the longitudinal opening, and terminating in a concave valve seat 10.

Extending longitudinally through the valve seat members 5 and 6 are channels 11, enlarged and internally threaded at their outer ends as indicated at 12 for receiving the ends of flow lines (not shown).

Rotatably mounted between the valve seats 10 is a ball or gate 13, having a through port 14 of a diameter equal to the channels 11 and adapted to register therewith when in open position.

In order to rotate the ball, a slot 15 is provided therein for seating a corresponding key 16, fixed on the lower end of a valve stem 17, extending through the central opening 18 of a bonnet member 19. By forming the slot in the ball in transverse relation to the through port 14 the ball is free to float when turned to closed position so that fluid pressure flowing through the line may be utilized for urging the ball into firm engagement with the seat.

The bonnet member is threaded into an extension 20 surrounding the opening 3 and is provided with an outwardly extending flange 21 adapted to seat on the flat end 22 of the extension. The central opening 18 of the bonnet includes a counter-bored portion 23 for seating packing 24 urged into sealing relation with the valve stem by a gland 25 formed integral with a cap 26 covering the bonnet.

A concentric socket 27 of the cap is internally threaded for engaging the external threads 28 of the extension 20 and is counter-bored as indicated at 29 for receiving a reduced neck 30 of the bonnet member. This novel structure of the bonnet and cap members produces a double sealing effect that will withstand very high fluid pressures without leakage around either the stem or the cap.

To operate the valve, a lever 31 is fixed on the squared upper end 32 of the stem by a nut 33, threaded on the extreme outer end 34 of the stem.

Means for limiting rotation of the ball when turned to either open or closed positions, includes spaced arcuate lugs 35 and 36 projecting from, and formed integrally with the lower end of the bonnet, and having abutment faces 37 and 38 to stop rotary movement of the key 16.

To provide for adjustment of the valve parts in order to insure proper sealing thereof, a plurality of thin annular rings 39, formed of laminated stock or the like, are inserted between the valve housing and valve seat members, and between the housing and the bonnet member.

Due to the floating position of the ball between the valve seats, the valve may be readily closed under very high liquid pressures and since the ball is at all times in intimate contact with the valve seats, foreign particles cannot lodge therebetween to prevent positive seating of the valve. By provision of the metal adjusting rings any wear of the valve that may result after long periods of service can be readily compensated for by removing one or more rings as required, and a greater tolerance in machining the valve can be allowed since the seats can be readily adjusted in the relation to the ball by means of the shims, thereby making it possible to greatly decrease the cost of manufacturing the valve.

What I claim and desire to secure by Letters Patent is:

In a valve of the character described, having a longitudinal opening and a lateral opening extending into the longitudinal opening, seat members extending into the longitudinal opening and having flow channels, a ball supported between said seat members and having a through port registerable with said channels, said ball having a slot, a bonnet secured in the side opening, spaced arcuate lugs projecting from the inner face of the bonnet member, and a valve stem rotatable in the bonnet and having a transverse key engageable with the slot for rotating the ball, and engageable with the lugs for limiting rotation of the stem.

In testimony whereof I affix my signature.

BENJAMIN P. HOFFMAN.